United States Patent
Mondal et al.

(10) Patent No.: US 9,298,726 B1
(45) Date of Patent: Mar. 29, 2016

(54) TECHNIQUES FOR USING A BLOOM FILTER IN A DUPLICATION OPERATION

(71) Applicant: NetApp, Inc., Sunnyvale, CA (US)

(72) Inventors: Shishir Mondal, Bangalore (IN); Praveen Killamsetti, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 13/632,892

(22) Filed: Oct. 1, 2012

(51) Int. Cl.
  *G06F 7/00* (2006.01)
  *G06F 17/00* (2006.01)
  *G06F 17/30* (2006.01)

(52) U.S. Cl.
  CPC .............. *G06F 17/30159* (2013.01)

(58) Field of Classification Search
  CPC ................................. G06F 17/30159
  USPC ............... 707/101, 2, 692; 711/161
  See application file for complete search history.

(56) References Cited

U.S. PATENT DOCUMENTS

| | | | |
|---|---|---|---|
| 2008/0005141 A1* | 1/2008 | Zheng et al. | 707/101 |
| 2008/0243769 A1* | 10/2008 | Arbour et al. | 707/2 |
| 2010/0042790 A1* | 2/2010 | Mondal et al. | 711/161 |
| 2010/0088296 A1* | 4/2010 | Periyagaram et al. | 707/705 |

OTHER PUBLICATIONS

Fielix Putze, Peter Sanders, Johannes Singler; Cache-, Hash- and Space-Efficient Bloom Filters; Jun. 2007.*

* cited by examiner

*Primary Examiner* — James Trujillo
*Assistant Examiner* — John J Morris
(74) *Attorney, Agent, or Firm* — Gilliam IP PLLC

(57) ABSTRACT

Techniques for using a bloom filter in deduplication are described herein. A change log comprising a plurality of data blocks may be received. Values associated with the data blocks may be hashed and compared with a bloom filter. The comparison with the bloom filter identifies data blocks from the change log as unique data blocks or potential duplicate data blocks. A bit by bit comparison of the potential duplicate data blocks and previous data blocks may be performed to determine if any of the potential duplicate data blocks are identical to any of previous data blocks. Such data blocks of the change log that are identified as being identical may be deduplicated.

20 Claims, 11 Drawing Sheets

|  | Data Block | Fingerprint | Location |
|---|---|---|---|
| Sorted | A | 001 | $I_1FB_3$ |
|  | C | 010 | $I_1FB_4$ |
|  | B | 100 | $I_2FB_1$ |
|  | D | 100 | $I_2FB_1$ |
| Unsorted | E | 111 | $I_2FB_3$ |
|  | F | 101 | $I_1FB_1$ |
|  | G | 110 | $I_1FB_2$ |

FIG. 9

TECHNIQUES FOR USING A BLOOM FILTER IN A DUPLICATION OPERATION

FIELD

Embodiments of the present disclosure relate to storage systems, and in particular, for using a bloom filter in a deduplication operation.

BACKGROUND

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of storage objects, such as files and logical units (LUs). A known type of file system is a write-anywhere file system that does not overwrite data on disks. An example of a write-anywhere file system that is configured to operate on a storage system is the Write Anywhere File Layout (WAFL®) file system available from NetApp, Inc. Sunnyvale, Calif.

The storage system may be further configured to allow many servers to access storage objects stored on the storage system. In this model, the server may execute an application, such as a database application, that "connects" to the storage system over a computer network, such as a point-to-point link, shared local area network (LAN), wide area network (WAN), or virtual private network (VPN) implemented over a public network such as the Internet. Each server may request the data services of the storage system by issuing access requests (read/write requests) as file-based and block-based protocol messages (in the form of packets) to the system over the network.

A plurality of storage systems may be interconnected to provide a storage system architecture configured to service many servers. In some embodiments, the storage system architecture provides one or more aggregates, each aggregate comprising a set of one or more storage devices (e.g., disks). Each aggregate may store one or more storage objects, such as one or more volumes. The aggregates may be distributed across a plurality of storage systems interconnected as a cluster. The storage objects (e.g., volumes) may be configured to store content of storage objects, such as files and logical units, served by the cluster in response to multi-protocol data access requests issued by servers.

Each storage system (node) of the cluster may include (i) a storage server (referred to as a "D-blade") adapted to service a particular aggregate or volume and (ii) a multi-protocol engine (referred to as an "N-blade") adapted to redirect the data access requests to any storage server of the cluster. In the illustrative embodiment, the storage server of each storage system is embodied as a disk element (D-blade) and the multi-protocol engine is embodied as a network element (N-blade). The N-blade receives a multi-protocol data access request from a client, converts that access request into a cluster fabric (CF) message and redirects the message to an appropriate D-blade of the cluster.

The storage systems of the cluster may be configured to communicate with one another to act collectively to increase performance or to offset any single storage system failure within the cluster. The cluster provides data service to servers by providing access to a shared storage (comprising a set of storage devices). Typically, servers will connect with a storage system of the cluster for data-access sessions with the storage system. During a data-access session with a storage system, a server may submit access requests (read/write requests) that are received and performed by the storage system.

Each storage system of the cluster may comprise a storage operating system. Moreover, each server may execute numerous applications requiring the data services of the cluster. The data of each server may be stored in storage objects on the shared storage, such as data aggregates, volumes, clones of volumes, etc. As such, the storage system may comprise a storage operating system that performs system operations on storage objects. For example, the storage operating system may perform a deduplication operation on a volume, produce a clone of the volume, and perform a split operation on the clone of the volume.

As known in the art, to conserve storage space on the storage system, data of a volume may be deduplicated. Data blocks of the volume may be identified as duplicate data blocks and at least one of the duplicate data blocks may be removed so that a single data block of the duplicate data blocks remains. Typically, however, the executing of a deduplication operation may take a significant amount of storage system resources. For example, the deduplication operation may comprise a bit by bit comparison among each data block in the volume. Such a comparison involving every data block of a volume may take a significant amount of processing time. As such, a more efficient deduplication technique is needed.

SUMMARY

The embodiments described herein provide a system and method for performing deduplication with the use of a bloom filter. In some embodiments, deduplication may refer to a data compression technique for eliminating redundant data. For example, a storage system may comprise a plurality of data blocks. Each of the data blocks may comprise pointers to data stored within the storage system. A deduplication operation on the storage system may result in a single instance of data being stored once in the storage system and multiple data blocks pointing to the single instance of the data in the storage system.

In some embodiments, a storage system may identify data blocks as candidates for deduplication by using content identifiers associated with the data blocks. A content identifier (e.g., fingerprint) represents the data of a data block. For example, each data block may be associated with at least one fingerprint that is a hash value (or checksum) of the data to which the data block is pointing. Data blocks having different fingerprints indicate that the data blocks comprise different data. Such data blocks with different fingerprints may not be subject to deduplication as the data of each of the data blocks is different.

Data blocks having matching fingerprints indicate that the data blocks comprise the same data, or there is a high probability that the data blocks comprise the same data. As such, if the data blocks have identical fingerprints, then the data that the data blocks point to may be identical. Such data blocks with identical fingerprints are candidates for deduplication as the data to which the data blocks point to may be identical. These candidate data blocks may be subject to a bit-by-bit comparison process to ensure that the data associated with the data blocks is in fact identical. If the data is verified to be identical, then the pointers of at least one of the data blocks may be modified to point to the data of the other data block. As such, a single instance of the data may be used (or pointed to) by a plurality of data blocks.

In some embodiments, a data structure may be used in the deduplication process. For example, the data structure (e.g., a bloom filter) may comprise a plurality of entries. One or more entries of the bloom filter may correspond to a single fingerprint and may comprise a binary value (e.g., a '1' or a '0'). For example, a plurality of entries (e.g., three entries) of the bloom filter may correspond to a single fingerprint. In some embodiments, the bloom filter may be used to identify data blocks that are candidates for performing the bit-by-bit comparison of the underlying data of the data blocks.

As such, the bloom filter may comprise a plurality of entries. In some embodiments, each fingerprint associated with a data block may be tested with the bloom filter to determine a corresponding "found" or "not found" status for the fingerprint and may comprise a binary value for the test result for the fingerprint (e.g., a value of '1' for 'found' or a value of '0' for 'not found'). In some embodiments, the bloom filter maintains a bitmap where each fingerprint maps to N number of bits (e.g., three) in the bitmap through N different hashing of the fingerprint value. A fingerprint value may be considered to be 'found' when hashed bits for all internal bitmaps corresponding to the fingerprint is set to '1' and may be considered to be 'not found' otherwise (e.g., hashed bits for all internal bitmaps corresponding to the fingerprint are not all set to '1'). For example, a bloom filter may be implemented by computing three bit indices for a given fingerprint and setting the three bit indices to '1' when the fingerprint is inserted into the bloom filter. In some embodiments, when the same fingerprint is searched, the three bits are tested to see if they are set to '1'. If all of the bits are found to be set to '1', which typically happens when the fingerprint has been inserted, the test declares a 'found' status for the fingerprint. In some embodiments, fingerprint entries are not deleted from the bloom filter. In some embodiments, the bloom filter may be used to identify data blocks that are candidates for performing the bit-by-bit comparison of the underlying data of the data blocks.

For example, the storage system may receive a change log that comprises a record of data blocks and associated fingerprints that have recently been written to a volume of the storage system, but have not yet been processed for deduplication. Such data blocks may be referred to as new data blocks. The fingerprints of the new data blocks may be tested for whether they exist (e.g. 'found' or 'not found') in the bloom filter. For example, three bits of the bloom filter bitmaps may identify whether a data block associated with the fingerprint corresponding to the three entries has been previously received by the storage system (such data blocks may be referred to as previous data blocks). In some embodiments, records for the previous data blocks are stored in a data structure. For example, the data structure (e.g., a fingerprint database) may contain records and corresponding fingerprints for all data blocks used in a volume of the storage system. The bloom filter may indicate whether a previous data block corresponding to a particular fingerprint has been received or has not been received (e.g., 'found' or 'not found' in the bloom filter). As such, in some embodiments, the bloom filter may be used to filter or eliminate incoming records of data blocks if a fingerprint of the incoming data block records is not set in the bloom filter In some embodiments, a first group of binary values (e.g., all '0' indicating 'not found') of the bloom filter may indicate that no previous data block associated with the fingerprint corresponding to the first group of binary values (e.g., three entries) has been previously received and a second group of binary values (e.g., all set to '1' indicating 'found') of the bloom filter may indicate that at least one previous data block associated with the fingerprint corresponding to the second group of binary values has been previously received. As such, the fingerprints of the new data block may be compared with the corresponding entries of the bloom filter to determine if a previous data block with the same fingerprint has been previously received (and is thus in the fingerprint database).

In some embodiments, if a plurality of bloom filter entries indicate that a new data block's fingerprint is not associated with a previous data block (e.g., the plurality of entries comprise at least one '0' and thus the fingerprint is 'not found'), then the new data block may be placed into a unique data block group. Such data blocks may be referred to as unique data blocks. Since the fingerprint of the unique data block is not associated with a previous data block, then the data of the unique data block is not identical to the data of a data block currently stored on a volume of the storage system. Thus, the unique data block is not a candidate for deduplication. As such, the bloom filter may be used to filter incoming records of data blocks into unique data blocks and potential duplicate data blocks.

In some embodiments, if a plurality of bloom filter entries indicate that the new data block's fingerprint is associated with a previous data block (e.g., the plurality of entries of the bloom filter corresponding to the fingerprint of the new data block are all set to a value of '1' to indicate 'found'), then the new data block may be placed into a potential duplicate data block group. Such data blocks may be referred to as potential duplicate data blocks. Since the fingerprint of the potential duplicate data block is associated with a previous data block, then the data of the potential duplicate data block may be identical to the data of a previous data block currently stored on a volume of the storage system. As such, the potential duplicate data block is a candidate for deduplication.

In some embodiments, a duplicate bloom filter may be created to identify potential duplicate data blocks. For example, the duplicate bloom filter may be generated such that the duplicate bloom filter represents fingerprints from previously received fingerprints (e.g., a fingerprint database), fingerprints from the received data blocks (e.g., change log), and within the change log. In some embodiments, once the duplicate bloom filter is created, the received data blocks (e.g., the change log) and previously received fingerprints from the fingerprint database may be read again with the duplicate bloom filter to identify potential duplicate data blocks.

In some embodiments, the potential duplicate data blocks may be verified against the previous data blocks. For example, a duplicate bloom filter may be created based on a received change log. In some embodiments, the duplicate bloom filter may indicate potential duplicate data blocks from the change log. The duplicate bloom filter may be used to separate data blocks from the received change log and prior change logs (e.g., from a fingerprint database) with matching fingerprint values as the entries of duplicate bloom filter into a potential duplicate data block group. The data blocks in the potential duplicate data block group may then be verified to be duplicate data blocks or unique data blocks. For example, the data of the potential duplicate data blocks may be subject to a bit-by-bit comparison with the data of another data block. If the bit-by-bit comparison identifies the data of the potential duplicate data block to be identical to the data of another data block, then the potential duplicate data block may be a verified duplicate data block. In response, the pointers of one of the verified duplicate data block or the corresponding previous data block may be changed to match the pointers of the other data block. As a result, the verified duplicate data block and the previous data block may point to the same instance of data stored on a volume of the storage system.

In some embodiments, after determining the verified duplicate data blocks and changing any pointers of the data blocks, the data blocks in the unique data block group may be merged into the fingerprint database. For example, the data blocks may be placed into the fingerprint database based on a location of the data of each of the data blocks.

As such, the use of a bloom filter in a deduplication operation as disclosed herein presents an operating advantage for a storage system environment. For example, the bloom filter may be used to reduce operating time for sorting data block records.

BRIEF DESCRIPTION OF THE DRAWINGS

FIG. 9 is an exemplary fingerprint database used in some embodiments.

DETAILED DESCRIPTION

Figure 1:
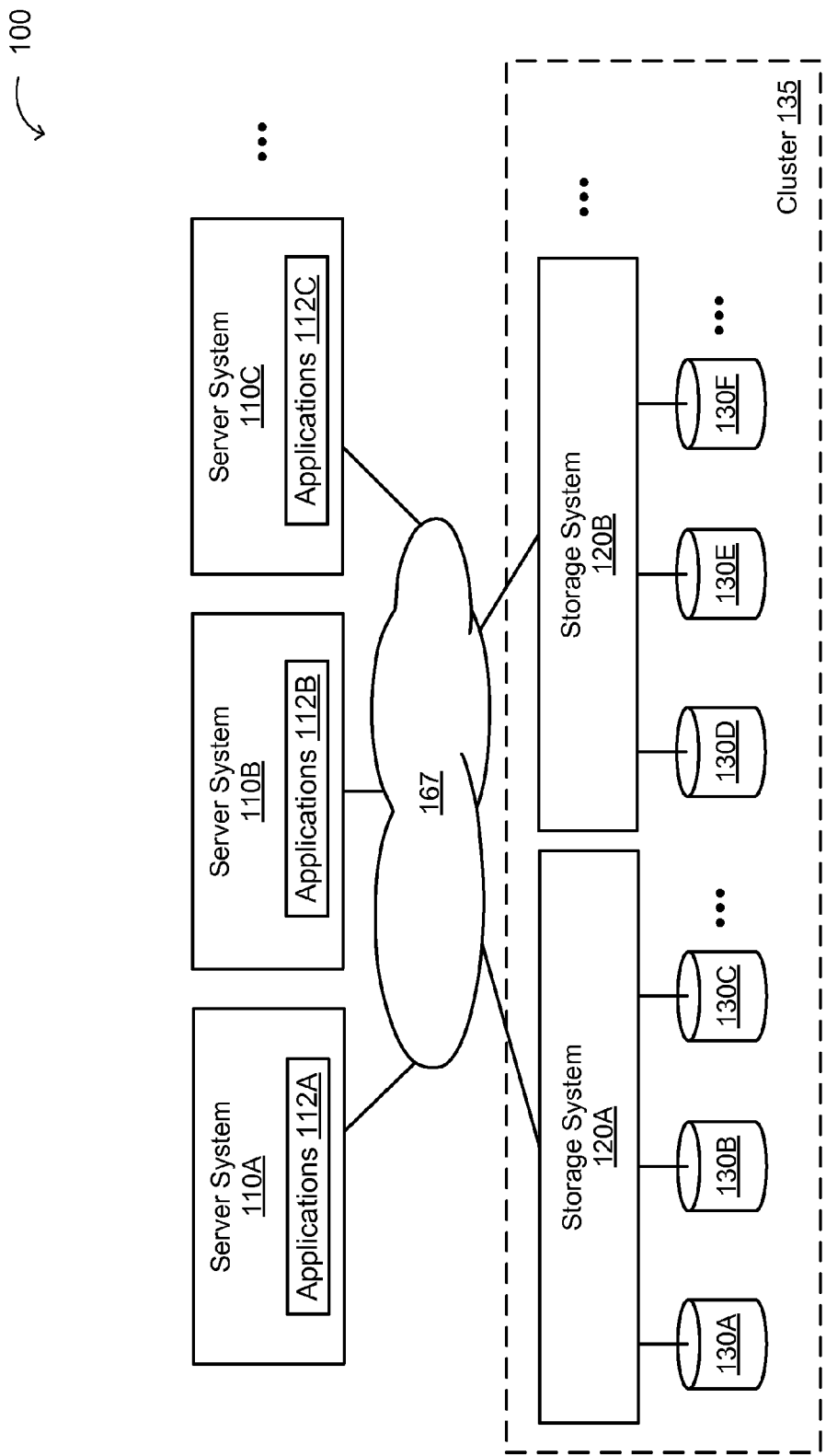
FIG. 1 is a schematic diagram of an exemplary distributed storage system environment in which some embodiments operate.

In the following description, numerous details and alternatives are set forth for purpose of explanation. However, one of ordinary skill in the art will realize that embodiments can be practiced without the use of these specific details. In other instances, well-known structures and devices are shown in block diagram form to not obscure the embodiments with unnecessary detail.

The description that follows is divided into three sections. Section I contains terms used herein. Section II describes a cluster storage system environment in which some embodiments operate. Section III describes a system and method using a bloom filter in a deduplication operation.

I. Terms

Storage object: As used herein, a storage object comprises any type of container for storing data. Examples of storage objects include, but are not limited to, files, LUs, qtrees, volumes, flexible volumes, aggregates, storage devices, etc. For illustrative purposes, the embodiments below are described in relation to a flexible volume, e.g., base flexible volume, flexible volume clone, flexible volume clone hierarchy, etc. However, in other embodiments, any other type of storage object may be used in the embodiments below.

Cluster storage system: As used herein, a cluster storage system may comprise a set of one or more storage systems. In some embodiments, the cluster may comprise one storage system. As such, the terms "cluster" and "storage system" may sometimes be used interchangeably. In other embodiments, a cluster comprises a plurality of storage systems.

Inode: As used herein, an inode may refer to file specific information. As such, each file on a storage system or in a flexible volume or flexible volume clone may be associated with an inode. In some embodiments, the inode may comprise file related metadata and pointers to data blocks.

Deduplication: As used herein, deduplication may refer to a data compression technique for eliminating redundant data. In some embodiments, deduplication of a volume may result in storage of data on a storage device once and multiple references within the volume may point to the single instance of the stored data. For example, a storage object (e.g., a volume) may comprise a plurality of data blocks. Each data block may comprise pointers that reference to a same block within a storage device. As such, a plurality of data blocks of a storage object may each point to a single block within a storage device.

Data block: As used herein, a data block may comprise pointers to underlying data associated with the data block. The underlying data may comprise client data that is stored to address locations on storage devices. The pointers of the data block may comprise references to the location of the underlying data. The storage system may perform deduplication on an original storage object whereby an instance of the underlying data is stored only once in a storage system and multiple data block pointers may point to the same single instance of the underlying data, thus providing storage saving benefits.

Fingerprint: As used herein, a fingerprint may be a hash value, footprint, or checksum of data (e.g., underlying data) of a data block. The fingerprint may be used to compare data blocks without having to read the data of the data blocks. A fingerprint may be computed by a hash algorithm for each of a plurality of data blocks. In some embodiments, data blocks with the same fingerprint may result in a fingerprint collision where two data blocks with different underlying data are associated with the same fingerprint, but the underlying data is different. Such an instance may be referred to as a false positive. However, if two data blocks have different fingerprints, then it may be assumed that the underlying data of the two data blocks are different.

Duplicate Data Blocks: As used herein, duplicate data blocks may refer to two or more data blocks with identical fingerprints and identical underlying data. As such, duplicate data blocks may be subject to a deduplication operation where the pointers of at least one of the duplicate data blocks may be changed to point to the underlying data of another duplicate data block.

Unique Data Block: As used herein, a unique data block may refer to a data block that does not comprise underlying data that is identical to underlying data of any other data block. As such, the unique data block may not be subject to a deduplication operation.

II. Cluster Storage System Environment

FIG. 1 is a block diagram of an exemplary virtual server environment 100 in which some embodiments operate. The environment 100 may comprises a set of one or more server systems and one or more storage systems 120 (e.g., server systems 110A, 110B, and/or 110C). The server systems 110 may each access one or more storage systems 120 (e.g., storage system 120a and/or 120b) that are connected to the server systems 110 via a network 167. The one or more storage systems 120 comprise a cluster storage system 135. Each storage system 120 in the cluster 135 may comprise a set of storage devices 130 (e.g., storage devices 130A, 130B, 130C, 130D, 130E, and/or 130F) for storing client data, the storage devices 130 of the cluster 135 comprising a shared storage of the storage system 120. Note that the server systems 110 are also connected to each other (e.g., via network 167) for communicating with each other (e.g., for working collectively to provide data-access service to a user/client system (not shown) for collectively hosting a plurality of virtual machines as described herein).

A server system 110 may comprise a computer system that may execute one or more applications 112 (e.g., applications 112A, 112B, and/or 112C) that interacts with the storage systems 120 for receiving read/write access requests and receiving or transmitting data over the network 167. In some embodiments, a server system 110 may comprise a chassis hosting multiple instances of server systems 110, each server system 110 hosting multiple client systems embodied as virtual machines. The network 167 and/or subnets of networks 167 may be physically embodied within such a chassis.

An application 112 executing on a server system 110 may provide data-access services by transmitting and processing access requests for data from the storage system(s) 120. In turn, an application 112 utilizes the services of the storage system 120 to access, store, and manage data in a set of storage devices 130. As such, a server system 110 may execute one or more applications 112 that submit access requests for accessing particular storage objects on the storage devices. Each application 112 may submit access requests for accessing particular storage objects on the storage systems of the cluster 135 and the cluster 135 may perform the received requests on the storage objects. An application 112 may comprises a non-virtual based application, such as a typical email exchange application or database application. In other embodiments, an application 112 may comprise a virtual-based application, such as a virtual machine (discussed below).

A storage system 120 may be coupled locally to a server system 110 over a network 167 such as a local area network (LAN), an Ethernet subnet, a PCI or PCIe subnet, a switched PCIe subnet, a wide area network (WAN), a metropolitan area network (MAN), the Internet, or the like. In some embodiments, a server system 110 may comprise a chassis hosting multiple instances of server systems 110 within a single chassis (e.g., a blade server chassis), with each instance of a server system 110 in communication with each other instance of a server system 110 in the chassis via network 167.

Each storage system 120 may have a distributed architecture. For example, each storage system 120 may include separate N module (network module) and D module (data module) components (not shown). In such an embodiment, the N module is used to communicate with the server systems 110, while the D module includes the file system functionality and is used to communicate with the storage devices 130. In another embodiment, the storage system 120 may have an integrated architecture, where the network and data components are all contained in a single box or unit. The storage system 120 may be coupled through a switching fabric (not shown) to other storage systems 120 in the cluster 135. In this way, all the storage systems 120 of the cluster 135 may be interconnect to form a single storage pool that may be accessed by the connected server systems 110.

The storage systems 120 comprise functional components that cooperate to provide a distributed storage system architecture providing consolidated data services to the server systems 110. A server system 110 may comprise a computer system that utilizes services of the cluster storage system 135 to store and manage data in the storage devices 130 of the storage systems 120. Interaction between a server system 110 and a storage system 120 can enable the provision of storage services. That is, server system 110 may request the services of the storage system 120, and the storage system 120 may return the results of the services requested by the server system 110, by exchanging packets over the connection system 167. The server system 110 may request the services of the storage system by issuing packets using file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the server system 110 may issue packets including block-based access protocols, such as the Fibre Channel Protocol (FCP), or Internet Small Computer System Interface (iSCSI) Storage Area Network (SAN) access, when accessing information in the form of blocks.

The storage system 120 may comprise a computer system that stores data in a set of storage devices 130, preferably on one or more writable storage device media (such as magnetic storage devices, video tape, optical, DVD, magnetic tape, and any other similar media adapted to store information, including data and parity information). The storage system 120 may implement a file system to logically organize the data as storage objects on the storage devices 130. A storage system 120 or a server system 110 may execute one or more applications 112 that submit access requests for accessing particular storage objects on the storage devices 130.

Interaction between the server systems 110 and the storage system(s) 120 can enable the provision of storage services. That is, the server systems 110 may request the services of the storage system(s) 120 (by submitting read/write access requests), and the storage system(s) 120 may respond to read/write access requests of the server systems 110 by receiving or transmitting data to the server systems 110 over the network 167 (e.g., by exchanging data packets through a connection over the network 167).

Communications between a storage system 120 and any of server systems 110 are typically embodied as packets sent over the computer network 167. A server system 110 may send an access request (a read/write access request) to the storage system 120 for accessing particular data stored on the storage system. The server system 110 may request the services of the storage system 120 by issuing storage-access protocol messages formatted in accordance with a conventional storage-access protocol for accessing storage devices (such as CIFS, NFS, etc.). Access requests (e.g., read/write access requests) may be implemented by issuing packets using file-based access protocols—such as the Common Internet File System (CIFS) protocol or Network File System (NFS) protocol—over the Transmission Control Protocol/Internet Protocol (TCP/IP) when accessing data in the form of files and directories. Alternatively, the server system 110 may issue access requests by issuing packets using block-based access protocols—such as the Fibre Channel Protocol (FCP), or Internet Small Computer System Interface (iSCSI) Storage Area Network (SAN) access—when accessing data in the form of blocks.

Each application 112 executing on a server system 110 may utilize services of the cluster 135 to store and access its data. The storage system 120 may comprise a computer system that stores data in a set of one or more storage devices 130 as storage objects. A storage device 130 may comprise writable storage device media such as storage devices, video tape, optical devices, DVD, magnetic tape, flash memory, Magnetic Random Access Memory (MRAM), Phase Change RAM (PRAM), or any other similar media adapted to store information (including data and parity information).

As known in the art, a storage device 130 may comprise storage objects comprising one or more storage volumes, where each volume has a file system implemented on the volume. A file system implemented on the storage devices 130 may provide multiple directories in a single volume, each directory containing zero or more filenames. A file system provides a logical representation of how data (files) are organized on a volume where data is represented as filenames that are organized into one or more directories. Examples of common file systems include New Technology File System (NTFS), File Allocation Table (FAT), Hierarchical File System (HFS), Universal Storage Device Format (UDF), UNIX® file system, and the like. For the Data ONTAP® storage operating system (available from NetApp, Inc. of Sunnyvale, Calif.) which may implement a Write Anywhere File Layout (WAFL®) file system, there is typically a WAFL file system within each volume, and within a WAFL file system, there may be one or more logical units (LUs).

Figure 2:
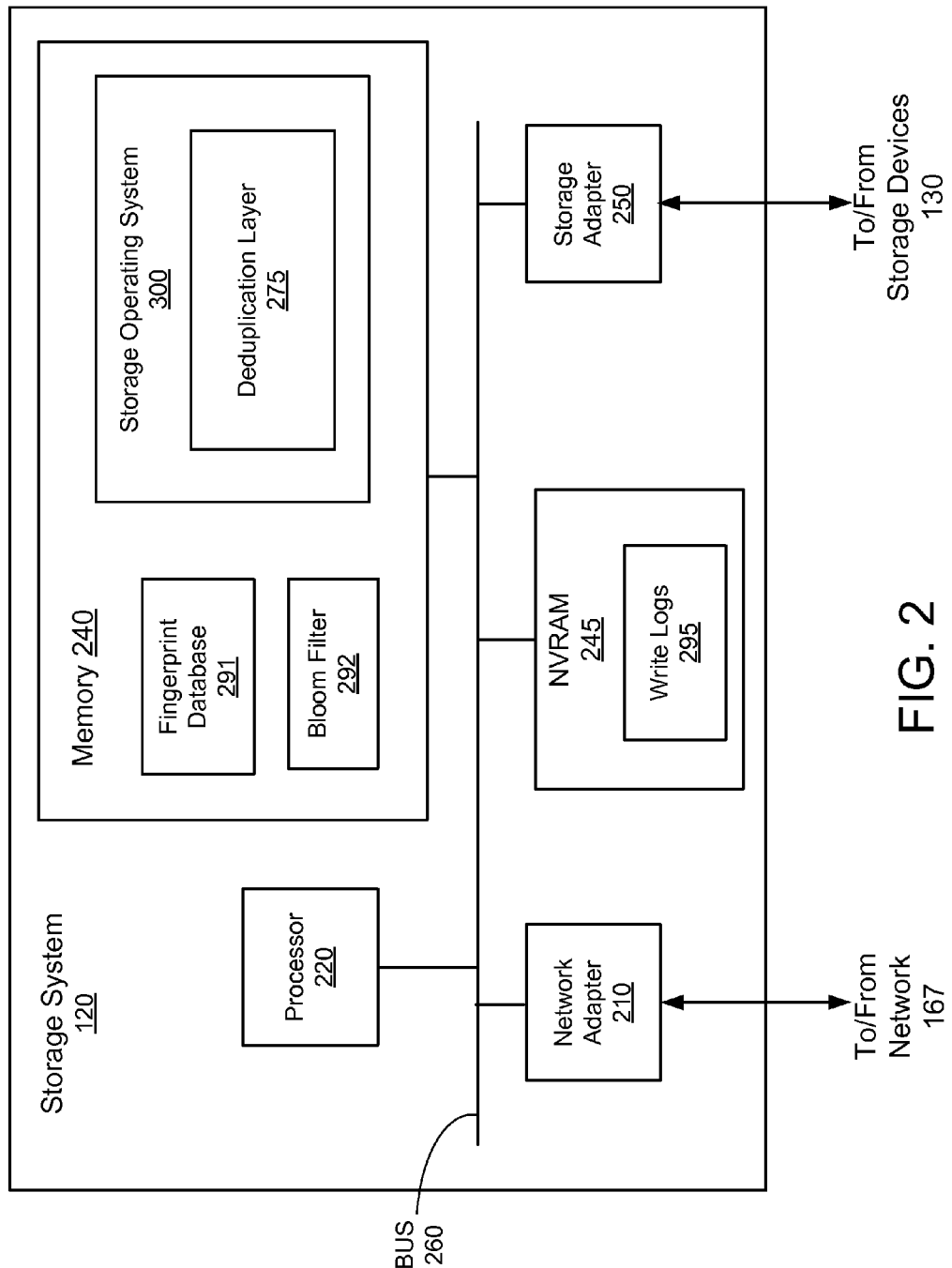
FIG. 2 is a schematic diagram of an exemplary storage system that may be employed in the storage system environment in which some embodiments operate.

FIG. 2 is a schematic block diagram of an exemplary storage system 120 that may be employed in the storage system environment of FIG. 1. Those skilled in the art will understand that the embodiments described herein may apply to any type of special-purpose computer (e.g., storage system) or general-purpose computer, including a standalone computer, embodied or not embodied as a storage system. To that end, storage system 120 can be broadly, and alternatively, referred to as a computer system. Moreover, the teachings of the embodiments described herein can be adapted to a variety of storage system architectures including, but not limited to, a network-attached storage environment, a storage area network and disk assembly directly-attached to a server computer. The term "storage system" should, therefore, be taken broadly to include such arrangements.

The storage system 120 comprises a network adapter 210, a processor 220, a memory 240, a non-volatile random access memory (NVRAM) 245, and a storage adapter 250 interconnected by a system bus 260. The network adapter 210 comprises the mechanical, electrical and signaling circuitry needed to connect the storage system 120 to a server system 110 over a computer network 167. The storage system may include one or more network adapters. Each network adapter 210 has a unique IP address and may provide one or more data access ports for server systems 110 to access the storage system 120 (where the network adapter accepts read/write access requests from the server systems 110 in the form of data packets).

The memory 240 comprises storage locations that are addressable by the processor 220 and adapters for storing software program code and data. The memory 240 may comprise a form of random access memory (RAM) that is generally cleared by a power cycle or other reboot operation (e.g., it is a "volatile" memory). In other embodiments, however, the memory 240 may comprise a non-volatile form of memory that does not require power to maintain information. The processor 220 and adapters may, in turn, comprise processing elements and/or logic circuitry configured to execute the software code and manipulate the data stored in the memory 240.

The storage system 120 may also include a NVRAM 245 that may be employed as a backup memory that ensures that the storage system 120 does not "lose" received information, e.g., CIFS and NFS requests, in the event of a system shutdown or other unforeseen problem. The NVRAM 245 is typically a large-volume solid-state memory array (RAM) having either a back-up battery, or other built-in last-state-retention capabilities (e.g. a FLASH memory), which holds the last state of the memory in the event of any power loss to the array. Therefore, even if an access request stored in memory 240 is lost or erased (e.g., due to a temporary power outage) it still may be recovered from the NVRAM 245.

The processor 220 executes a storage operating system application 300 of the storage system 120 that functionally organizes the storage system by, inter alia, invoking storage operations in support of a file service implemented by the storage system. In some embodiments, the storage operating system 300 comprises a plurality of software layers (including a deduplication layer 275) that are executed by the processor 220. In some embodiments, the deduplication layer 275 is implemented to deduplicate data blocks of a volume. Portions of the storage operating system 300 are typically resident in memory 240. It will be apparent to those skilled in the art, however, that other processing and memory means, including various computer readable media, may be used for storing and executing program instructions pertaining to the storage operating system 300.

In some embodiments, a fingerprint database 291 is resident in memory 240. In other embodiments, the metadata structure 290 may also be resident in NVRAM 245 or stored on a storage device 125. As discussed below, in some embodiments, the fingerprint database 291 is produced and used by the deduplication layer 275 to store records for sequences of stored data blocks and is used to determine how to perform a deduplication operation. 240. The fingerprint database 291 may contain records of fingerprint values for data blocks, as discussed in further detail below. Furthermore, at least one bloom filter 292 may be resident in memory 240 and also used to facilitate a deduplication operation.

The storage adapter 250 cooperates with the storage operating system 300 executing on the storage system 120 to access data requested by the server system 110. The data may be stored on the storage devices 130 that are attached, via the storage adapter 250, to the storage system 120 or other node of a storage system as defined herein. The storage adapter 250 includes input/output (I/O) interface circuitry that couples to the storage devices 130 over an I/O interconnect arrangement, such as a conventional high-performance, Fibre Channel serial link topology. In response to an access request received from a server system 110, data may be retrieved by the storage adapter 250 and, if necessary, processed by the processor 220 (or the adapter 250 itself) prior to being forwarded over the system bus 260 to the network adapter 210, where the data may be formatted into a packet and returned to the server system 110.

In an illustrative embodiment, the storage devices 130 may comprise disk devices that are arranged into a plurality of volumes, each having a file system associated therewith. In some embodiments, the storage devices 130 comprise disk devices that are configured into a plurality of RAID (redundant array of independent disks) groups whereby multiple storage devices 125 are combined into a single logical unit (i.e., RAID group). In a typical RAID group, storage devices 125 of the group share or replicate data among the disks which may increase data reliability or performance. The storage devices 130 of a RAID group are configured so that some disks store striped data and at least one disk stores separate parity for the data, in accordance with a preferred RAID-4 configuration. However, other configurations (e.g. RAID-5 having distributed parity across stripes, RAID-DP, etc.) are also contemplated. A single volume typically comprises a plurality of storage devices 130 and may be embodied as a plurality of RAID groups.

The organization of a storage operating system 300 for the exemplary storage system 120 is now described briefly. However, it is expressly contemplated that the principles of the embodiments described herein can be implemented using a variety of alternative storage operating system architectures. As discussed above, the term "storage operating system" as used herein with respect to a storage system generally refers to the computer-executable code operable on a storage system that implements file system semantics (such as the above-referenced WAFL®) and manages data access. In this sense, Data ONTAP® software is an example of such a storage operating system implemented as a microkernel. The storage operating system can also be implemented as an application program operating over a general-purpose operating system, such as UNIX® or Windows®, or as a general-purpose operating system with configurable functionality.

Figure 3:
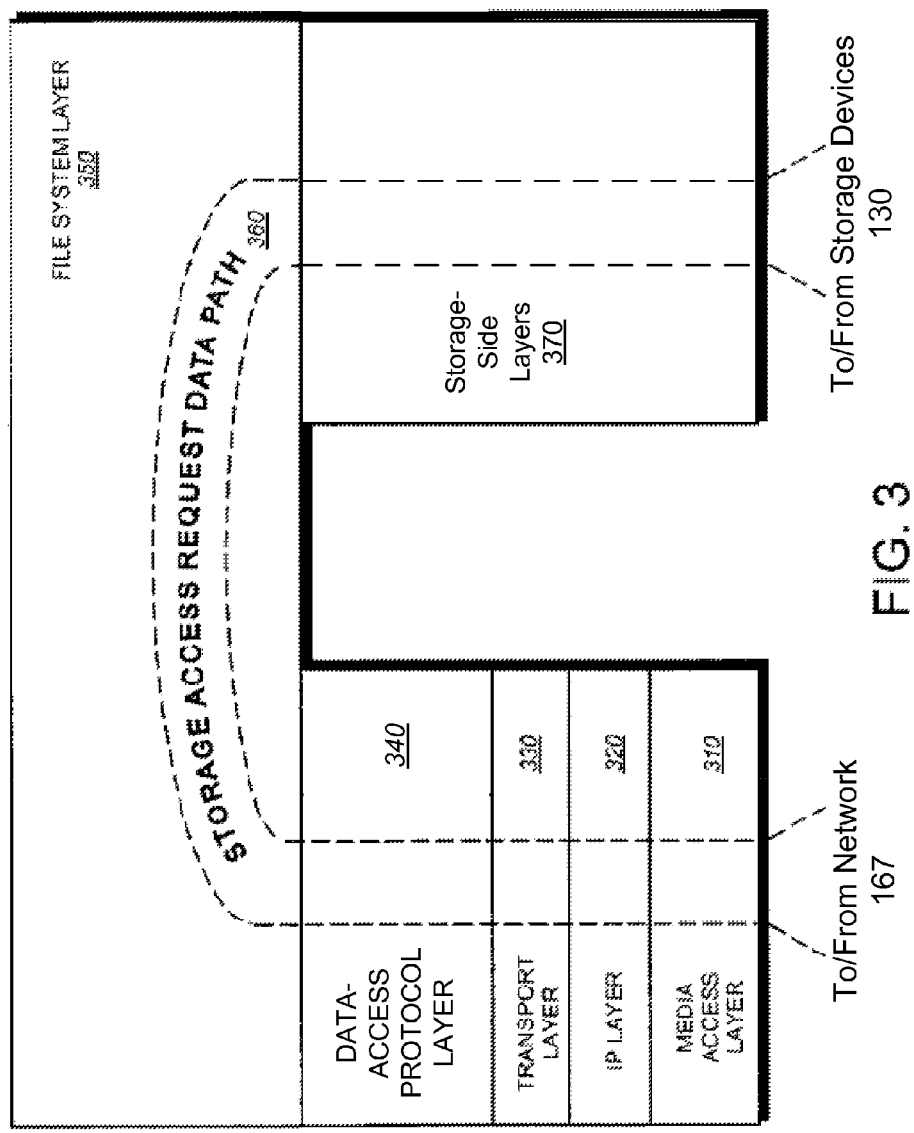
FIG. 3 is a schematic diagram of a set of software layers that form an integrated protocol software stack used in a storage operating system in accordance with some embodiments.

As shown in FIG. 3, the storage operating system 300 comprises a set of software layers that form an integrated protocol software stack. The protocol stack provides data paths 360 for server systems 110 to access data stored on the storage system 120 using data-access protocols. The protocol stack includes a media access layer 310 of network drivers (e.g., an Ethernet driver). The media access layer 310 interfaces with network communication and protocol layers, such as the Internet Protocol (IP) layer 320 and the transport layer 330 (e.g., TCP/UDP protocol). The IP layer 320 may be used to provide one or more data access ports for server systems 110 to access the storage system 120. In some embodiments, the IP layer 320 provides a dedicated private port for each of one or more remote-file access protocols implemented by the storage system 120.

A data-access protocol layer 340 provides multi-protocol data access and, for example, may include file-based access protocols, such as the Hypertext Transfer Protocol (HTTP) protocol, the NFS protocol, the CIFS protocol, and so forth. The storage operating system 300 may include support for other protocols, such as block-based access protocols. Such protocols may include, but are not limited to, the direct access file system (DAFS) protocol, the web-based distributed authoring and versioning (WebDAV) protocol, the Fibre Channel Protocol (FCP), the Internet small computer system interface (iSCSI) protocol, and so forth.

Figure 4:
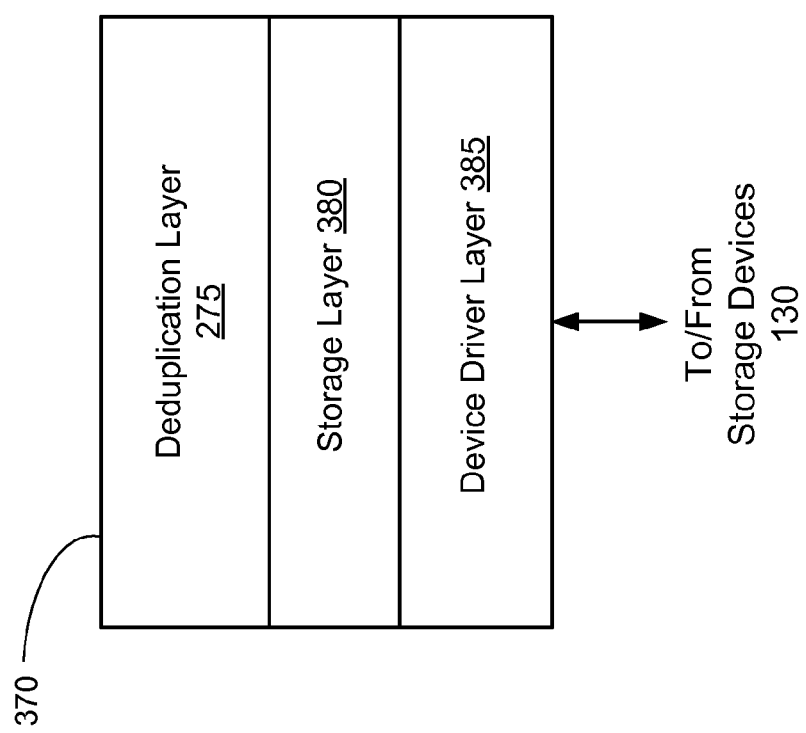
FIG. 4 is a schematic diagram of storage-side layers for implementing a storage protocol for an exemplary storage system in which some embodiments operate.

The storage operating system 300 may manage the storage devices 130 using storage-side layers 370. As shown in FIG. 4, the storage-side layers 370 may include a storage layer 380 that implements a storage protocol (such as a RAID protocol) and a device driver layer 385 that implements a device control protocol (such as small computer system interface (SCSI), integrated drive electronics (IDE), etc.). Bridging the storage-side layers 370 with the network and protocol layers is a file system layer 350 of the storage operating system 300. In an illustrative embodiment, the file system layer 350 implements a file system having an on-disk format representation that is block-based using inodes to describe the files.

The file system layer 350 assigns, for each file, a unique inode number and an associated inode. An inode may comprise a data structure used to store metadata information about the file (such as name of the file, when the file was produced or last modified, ownership of the file, access permission for the file, size of the file, etc.). Each inode may also contain information regarding the block locations of the file. In some embodiments, the block locations are indicated by a unique logical block number (LBN) given for each block of the file. As discussed below, if a storage device comprises a disk device, a set of blocks having sequential LBNs indicates that the set of blocks are stored sequentially on a same track of the disk device. The file system 350 may store and maintain an inode file that contains and indexes (by inode number) the inodes of the various files. In some embodiments, the LBN may be referred to as a file block number and, as such, each data block stored by the storage system may be associated with an inode and a file block number. In the same or alternative embodiments, such information is managed by the file system layer 350.

In response to receiving a file-access request (containing an external file handle) from a server system 110, the file system 350 generates operations to load (retrieve) the requested data from storage devices 130 (if it is not resident in the storage system's memory 240). The external file handle in the access request typically identifies a file or directory requested by the server system 110. Specifically, the file handle may specify a generation number, inode number and volume number corresponding to the requested data. If the information is not resident in the storage system's memory 240, the file system layer 350 indexes into the inode file using the received inode number to access the appropriate inode entry for the identified file and retrieve file location information (e.g., logical block number) from the inode.

The file system layer 350 then passes the logical block number to the appropriate driver (for example, an encapsulation of SCSI implemented on a fibre channel interconnection) of the device driver layer 385. The device driver layer 385 accesses the appropriate data blocks from the storage devices 130 and loads the requested data in memory 240 for processing by the storage system 120. Upon successful completion of the request, the storage system (and storage operating system) returns a response (e.g., a conventional acknowledgement packet defined by the CIFS specification) to the server system 110 over the network 167.

It should be noted that the software "path" 360 through the storage operating system layers described above needed to perform data storage access for the requests received at the storage system may alternatively be implemented in hardware or a combination of hardware and software. That is, in an alternative embodiment, the storage access request path 360 may be implemented as logic circuitry embodied within a field programmable gate array (FPGA) or an application specific integrated circuit (ASIC). This type of hardware implementation may increase the performance of the file service provided by storage system 120 in response to a file system request packet issued by server system 110. Moreover, in a further embodiment, the processing elements of network and storage adapters 210 and 250 may be configured to offload some or all of the packet processing and storage access operations, respectively, from processor 220 to thereby increase the performance of the data access service provided by the storage system 120.

In some embodiments, the storage operating system 300 also comprises a deduplication layer 275 that operates in conjunction with the other software layers and file system of the storage operating system 300 to deduplicate data stored on the storage system 120 as described herein. For example, in some embodiments, the deduplication layer 275 may reside between the file system layer 350 and the storage layer 380 of the storage operating system 300 (as shown in FIGS. 3 and 4). In other embodiments, the deduplication layer 275 may reside near other layers of the storage operating system 300.

In some embodiments, the storage-side layers 370 also include a de-staging layer 375. For example, in some embodiments, the de-staging layer 375 may reside between the file system layer 350 and the deduplication layer 275 of the storage operating system 300. In other embodiments, the de-staging layer 375 may reside near other layers of the storage operating system 300.

The de-staging layer 375 may be implemented in some storage systems 125 to perform received write requests for files in two stages. In a first stage, write requests received by the file system layer 350 are sent to the de-staging layer 375, a write request containing blocks of data to be written. The de-staging layer 375 produces a write log for each received write request, a write log containing the blocks of data to be written. The write logs 295 may be stored, for example, to the NVRAM 245 (as shown in FIG. 2). In a second stage, at predetermined time intervals (referred to as consistency points), accumulated write logs 295 (e.g., in the NVRAM 245) are sent to the storage layer 380 which then writes the blocks of data in the write logs to a storage device 125.

Embodiments described herein may be applied to a storage system 120 that is implemented with or without a de-staging layer 375. In some embodiments, the deduplication layer 275 is used in conjunction with the de-staging layer 375. In these embodiments, the deduplication layer 275 may process the write logs accumulated during the first stage that are awaiting the next consistency point to be written to a storage device 130. During this time, the deduplication layer 275 may process the blocks in the accumulated write logs for possible deduplication before the blocks are written to the storage devices 130. In other embodiments, the deduplication layer 275 is used without use of a de-staging layer 375. In these embodiments, the deduplication layer 275 may receive write requests from the file system 350 and process blocks of the write requests for deduplication as they are received.

Note that when a write log for a write request for a file is produced in the first stage, the file system layer 350 may assign LBNs for each block in the file to be written, the assigned LBN of a block indicating the location on a storage device 125 where the block will be written to at the next consistency point. Also, the file system layer 350 may assign an inode number and an inode for the file. As such, each write log may comprise blocks of data to be written, the locations (LBNs and/or also referred to as file block numbers) of where the blocks are to be written, and an inode number assigned to the file. As such, each data block may be associated with a block number and an inode. When a write log for a write request for a file is produced in the first stage, the file system layer 350 may also store LBNs for the blocks of the file in its assigned inode.

In other embodiments where the deduplication layer 275 is used without the de-staging layer 375, the deduplication layer 275 may receive write requests for files from the file system 350, whereby the file system layer 350 may assign LBNs for each block in the file to be written. Also, the file system layer 350 may assign an inode number and an inode for the file and store the assigned LBN for the blocks of the file in its assigned inode.

In some embodiments, the deduplication layer 275 may be pre-included in storage operating system 300 software. In other embodiments, the deduplication layer 275 may comprise an external auxiliary plug-in type software module that works with the storage operating system 300 to enhance its functions. As such, the deduplication layer 275 may be imposed upon an existing storage operating system 300 and file system 350 to provide deduplication of data as described herein.

As shown in FIG. 4, the storage-side layers 370 may include a storage layer 380 that implements a storage protocol (such as a RAID protocol) and a device driver layer 385 that implements a device control protocol (such as small computer system interface (SCSI), integrated drive electronics (IDE), etc.). Bridging the storage-side layers 370 with the network and protocol layers is a file system layer 350 of the storage operating system 300. In an illustrative embodiment, the file system layer 350 implements a file system having an on-disk format representation that is block-based using inodes to describe the files.

III. Using a Bloom Filter in a Deduplication Operation

Figure 5:
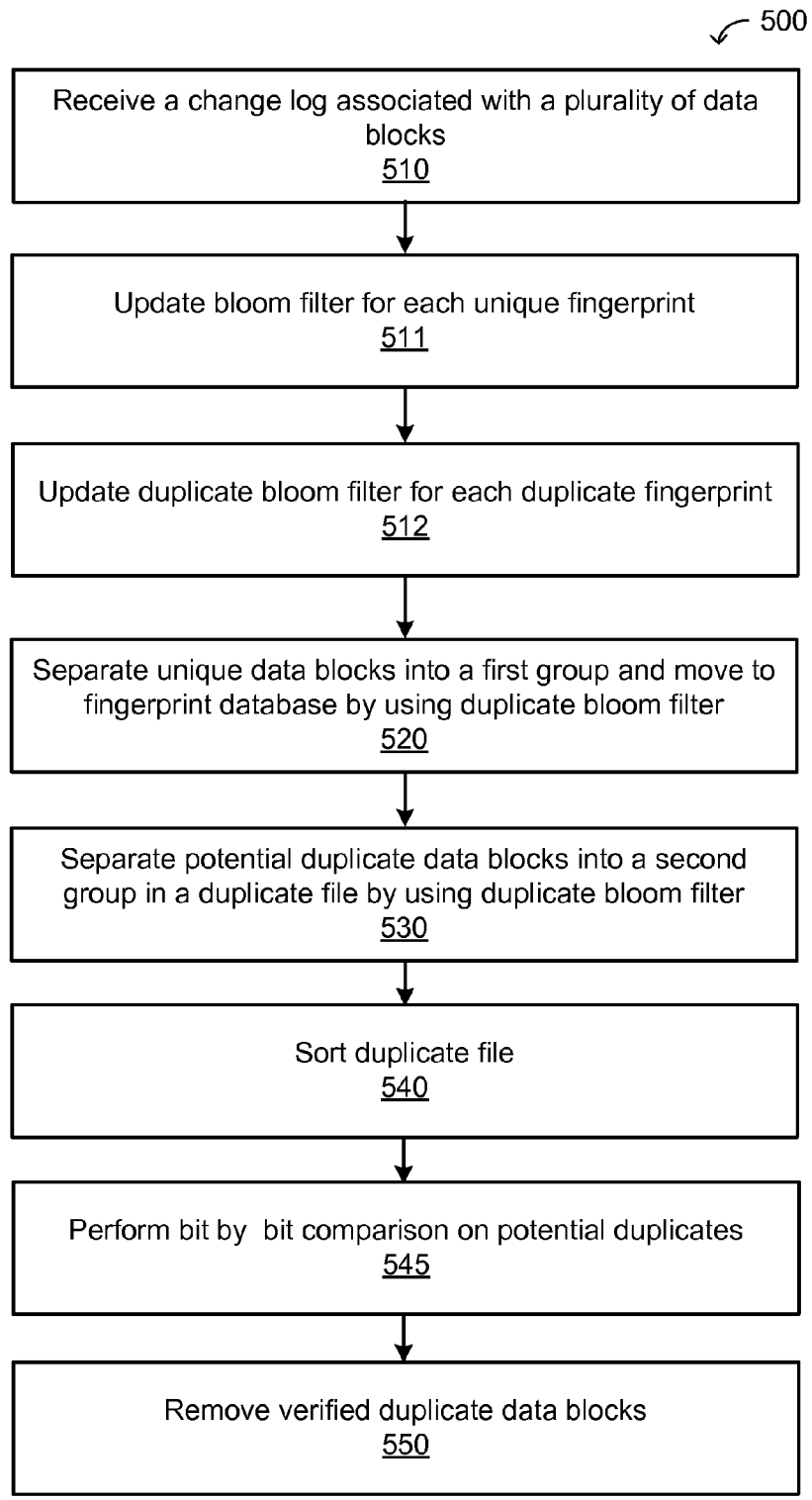
FIG. 5 is a flowchart of a technique to delete verified duplicate data blocks in which some embodiments operate.

FIG. 5 is a flowchart of a technique 500 to delete verified duplicate data blocks in which some embodiments operate. In general, the technique 500 may be used to separate data blocks of a change log into unique data blocks (e.g., data blocks comprising new data content and, as such, associated with a new fingerprint) and potential duplicate data blocks (e.g., data blocks potentially comprising redundant data content already stored on a storage device 130 and, as such, associated with a previously received data block's fingerprint). In some embodiments, some of the steps of the technique 500 are performed or caused to be performed by a storage operating system 300 of a storage system 120 by using the deduplication layer 275. The storage operating system 300 and/or deduplication layer 275 may be configured to operate in conjunction with other software modules of the storage system 120, server system 110, and software modules to collectively perform the embodiments described herein.

As shown in FIG. 5, the technique 500 may receive (at step 510) a change log associated with a plurality of data blocks. In some embodiments, the change log may comprise a record of data blocks that were recently written to a volume of a storage system and have not yet been analyzed or compared to previously received data blocks (e.g., records from a fingerprint database 291) for deduplication. As such, the change log may be considered to comprise records associated with new data blocks. The technique 500 may update (at step 511), a bloom filter. In some embodiments, the technique 500 may update the bloom filter for each unique fingerprint from the change log. For example, the bloom filter may be updated to indicate data blocks that have not been previously received have been received from the change log associated with step 510. As such, the bloom filter may be updated to indicate unique data blocks that have been received from the change log. Next, the technique 500 may create (at step 512) a duplicate bloom filter. In some embodiments, the duplicate bloom filter may indicate fingerprints for data blocks of the received change log that are potential duplicate data blocks. The technique 500 may separate (at step 520) the new data blocks from the change log into a first group. In some embodiments, the separation may be performed by using the duplicate bloom filter. For example, new data blocks that are identified as comprising new content (e.g., a fingerprint associated with the new data block has not been previously identified or received) may be placed into a first group. Such new data blocks that have not been previously identified or received may be referred to as unique data blocks and a grouping of the unique data blocks may be referred to as a unique data block group. In some embodiments, the unique data blocks may be moved or recorded in a fingerprint database. Furthermore, the technique 500 may separate (at step 530) one or more of the new data blocks from the change log and one or more data blocks of the fingerprint database into a second group. In some embodiments, the separation may be performed by using the duplicate bloom filter. For example, data blocks that are identified as being associated with a previously received fingerprint (e.g., from a previous change log) may be placed into a second group. In some embodiments, the second group may be a duplicate file comprising potential duplicate data blocks. In the same or alternative embodiments, the received change log and a fingerprint database may be scanned or read against the duplicate bloom filter to identify potential duplicate data blocks between the received change log and the fingerprint database comprising previously received data blocks. As such, the duplicate bloom filter may be used to identify data blocks from the fingerprint database that are potential duplicate data blocks. Such data blocks associated with fingerprints that have been identified as associated with previously received data blocks of a previous change log may be referred to as potential duplicate data blocks and a grouping of the potential duplicate data blocks may be referred to as a potential duplicate data block group. As such, the technique 500 may separate (at steps 520 and 530) data blocks from a change log into a unique data block group and a potential duplicate data block group based on an analysis or comparison of fingerprints.

As shown in FIG. 5, the technique 500 may further sort (at step 540) the second group (e.g., the duplicate file). In some embodiments, the second group may be sorted based on fingerprint values. Furthermore the technique 500 may perform (at step 545) a bit-by-bit comparison of duplicate data blocks. For example, the data content of the potential duplicate data blocks may be compared with the data content of previously received data blocks (e.g., from previous change logs) from a fingerprint database to determine if any of the potential duplicate data blocks comprises identical data content as a previously received data block from the fingerprint database. The technique 500 may further remove or delete (at step 550) potential duplicate data blocks that have been verified as being duplicates. For example, data blocks from the potential duplicate data block group that are identified to comprise identical data content as at least one previously received data block from a previous change log may be removed. Potential duplicate data blocks that are verified as duplicates of previously received data blocks may be referred to as verified duplicate data blocks. In some embodiments, each data block may comprise pointers or references to data content stored within the storage system. As such, removing or deleting a data block may correspond to changing the pointers or references of a data block and/or deleting the data content that the pointers or references of the data block correspond to. For example, the pointers or references of a first data block may be changed to match the pointers or references of a second data block. In some embodiments, the change log may be stored within the memory 240 of a storage system 120. Further details with regard to the steps of the technique 500 are further discussed below.

Figure 6:
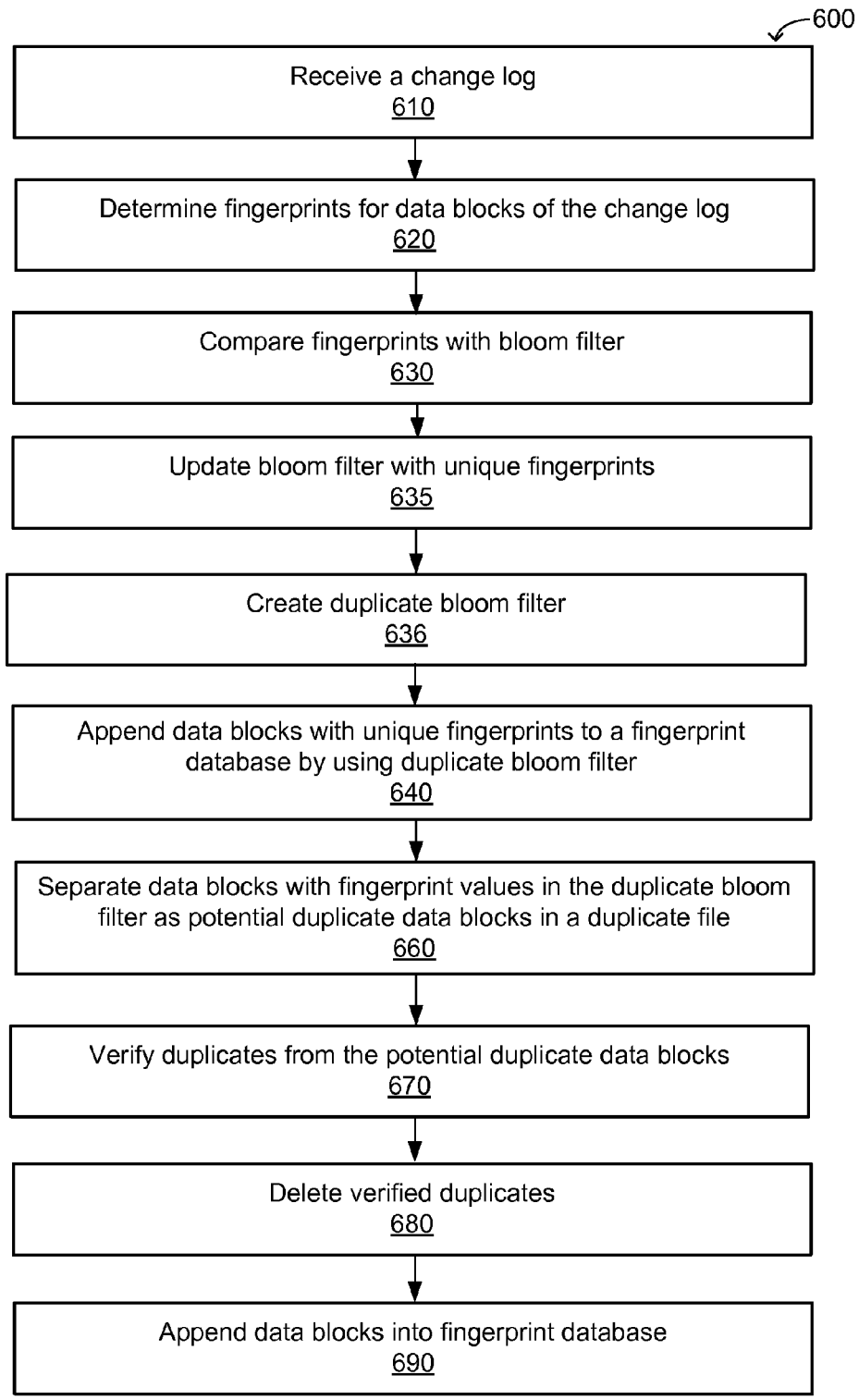
FIG. 6 is a flowchart of a technique to compare fingerprints of data blocks to entries of a bloom filter and to remove verified duplicate data blocks in accordance with some embodiments.

FIG. 6 is a flowchart of a technique 600 to compare fingerprints of new data blocks to entries of a bloom filter (e.g., bloom filter 292) and to remove verified duplicate data blocks. In some embodiments, some of the steps of the technique 600 are performed or caused to be performed by a storage operating system 300 of a storage system 120 by using the deduplication layer 275. The storage operating system 300 and/or deduplication layer 275 may be configured to operate in conjunction with other software modules of the storage system 120, server system 110, and software modules to collectively perform the embodiments described herein.

As shown in FIG. 6, the technique 600 may receive (at step 610) a change log comprising records of a plurality of new data blocks. For example, a storage operating system 300 may receive (or retrieve) the change log from memory 240 of a storage system 120. In some embodiments, the technique 600 may be used for each change log received by a storage system. As such, the technique 600 may be used to receive a plurality of change logs. The technique 600 may further determine (at step 620) fingerprints for the new data blocks from received change log. In some embodiments, a fingerprint may correspond to a plurality of hash values associated with a data block. For example, a hashing algorithm (i.e., a fingerprinting algorithm) may generate a fingerprint for each new data block. In some embodiments, the hashing algorithm may be a procedure that maps the data content of a data block to a plurality of shorter bit strings that is referred to as a fingerprint. As such, the fingerprint of a data block may represent the data content of the data block, but may comprise a smaller size than the actual data content. In the same or alternative embodiments, each bit of the fingerprint of a data block is dependent upon the data content of the data block. In some embodiments, a plurality of fingerprints may be generated for each data block. In such a case, the data content of the data blocks may be associated with the combination of each of the plurality of fingerprints. As such, the fingerprint of a data block may represent the data content of the data block, but may be smaller in size than the data content that the fingerprint represents. In some embodiments, data blocks associated with different fingerprints may comprise different data content. However, data blocks with identical fingerprints may comprise different data content or may comprise identical data content as different data content may result in the same fingerprint being generated. In the same or alternative embodiments, a fingerprint may be a checksum value of the data content of a data block.

Figure 7A:
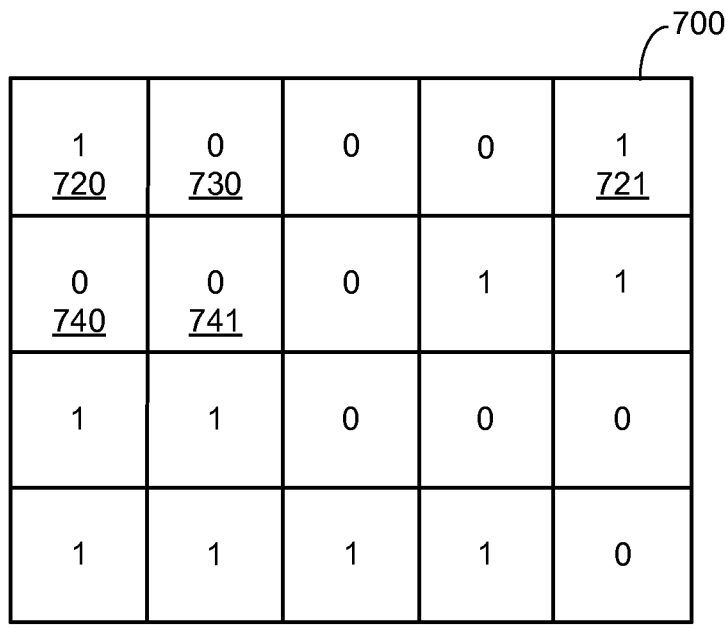
FIG. 7A is an exemplary representation of a bloom filter in accordance with some embodiments.
Figure 7B:
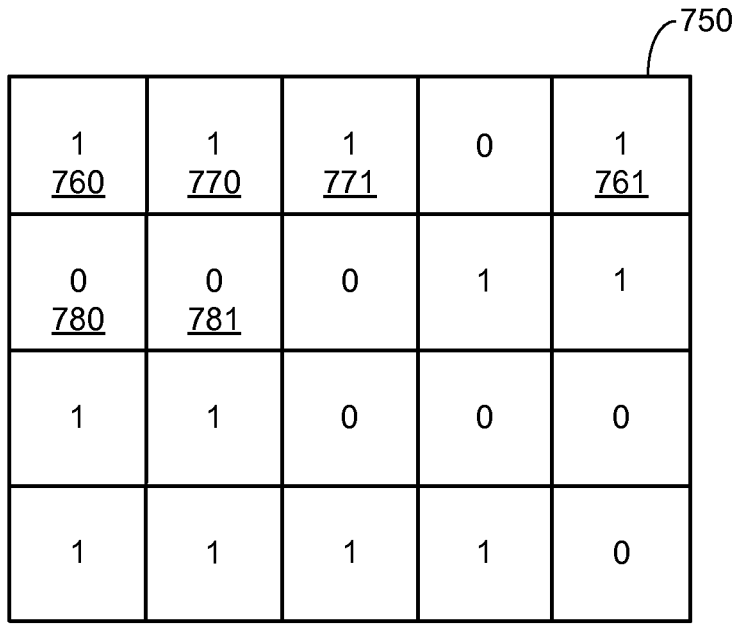
FIG. 7B is an exemplary representation of the bloom filter with updated entries in accordance with some embodiments.

As shown in FIG. 6, the technique 600 may analyze (at step 630) the fingerprints determined for each of the new data blocks of the change log. For example, the fingerprints of the new data blocks may be compared to a bloom filter. In some embodiments, a bloom filter may be a probabilistic data structure to test whether an element (e.g., a data block) is a member of a set. The bloom filter may be considered a data structure comprising a plurality of data structure entries where a plurality of data structure entries (e.g., three) correspond to a fingerprint value. In some embodiments, each group of data structure entries (e.g., three entries) may indicate whether a data block with a specific fingerprint has been previously received (e.g., from a previous change log) or if no data block with the specific fingerprint has been previously received. For example, each data structure entry may comprise a binary number (e.g., a '0' or a '1') and a plurality of the data structure entry values may be used to indicate if a data block with the specific fingerprint has or has not been previously received. In some embodiments, a value of '1' for a plurality of entries may indicate that a data block with the fingerprint associated with the data structure entries has been previously received and a '0' may indicate that a data block with the fingerprint associated with the data structure entries where at least one data structure entry of a plurality of data structure entries is a '0' has not been previously received. As such, the bloom filter may be used to determine or identify new data blocks associated with fingerprints that have not been previously received and new data blocks associated with fingerprints that have been previously received. Using the fingerprints and the bloom filter, new data blocks may be identified as unique data blocks (e.g., the fingerprint associated with the new data block has not been previously received) or identified as a potential duplicate data block (e.g., the fingerprint associated with the new data block has been previously received). The new data blocks associated with fingerprints that have been previously received may be a false positive. For example, the potential duplicate data blocks may actually be unique data blocks or verified duplicate data blocks, as discussed in further detail below. Thus, a comparison of the fingerprint of a new data block to the bloom filter may indicate for certain that the new data block is a unique data block (with new data content) or that the new data block is potentially (e.g., may or may not be) a duplicate of a previously received data block. In some embodiments, the technique 600 may update (at step 635) the bloom filter (e.g., the bloom filter used at step 630) to reflect the fingerprints of the new data blocks that have been appended to the fingerprint database. For example, data structure entries may be updated such that the entries associated with fingerprints of the new data blocks may be changed from a '0' to a '1'. FIGS. 7A and 7B further discloses the updating of the bloom filter in response to fingerprints of new data blocks. Next, the technique 600 may create (at step 636) a duplicate bloom filter. In some embodiments, the duplicate bloom filter may indicate which fingerprints associated with the received change log have been identified as potential duplicate data blocks.

As shown in FIG. 6, the technique 600 may append (at step 640) unique data blocks to a fingerprint database (e.g., fingerprint database 292 by using the duplicate bloom filter. For example, new data blocks with fingerprints that have not been previously received may be appended to the fingerprint database. In some embodiments, such appending may correspond to placing the new data blocks into a portion of the fingerprint database that is unsorted (as discussed in further detail below). In some embodiments, the technique 600 may mark or indicate where unique data blocks were appended to the fingerprint database. For example, the fingerprint database may comprise a first portion comprising previous data block records and the records for the unique data block may be included into a second portion after the first portion. An example of a fingerprint database is shown at FIG. 9. In some embodiments, the first portion of the fingerprint database may be arranged based on a location (e.g., an inode and a file block number) of the data blocks within the storage system. As such, the first portion may be referred to as a sorted portion of the fingerprint database. In the same or alternative embodiments, the new data blocks may be appended such that the second portion is arranged in order of the fingerprints associated with the new data blocks. As such, the second portion may not be sorted based on location and may be referred to as unsorted portion of the fingerprint database.

As shown in FIG. 6, the technique 600 may separate or group (at step 660) the new data blocks (from the received change log) with fingerprints that have been previously received and data blocks from the fingerprint database with fingerprints corresponding to the duplicate bloom filter into a potential duplicate data block group (e.g., a duplicate file). For example, the new data blocks with fingerprints corresponding to data structure entries with a '1' (e.g., a fingerprint corresponding to three data structure entries where all three data structure entries are '1') may be separated or grouped into the potential duplicate data block group. In some embodiments, the potential duplicate data block group indicates that the data blocks in the group may or may not be duplicates (e.g., comprising identical data content) of a previously received data block. As such, the potential duplicate data block may indicate data blocks from the received change log as well as data blocks from the fingerprint database that have been identified as potential duplicate data blocks based on the duplicate bloom filter. The technique 600 may further verify (at step 670) whether the potential duplicate data blocks of the duplicate file are duplicate data blocks or unique data blocks. In some embodiments, the verification may comprise a bit by bit comparison of the data content of the potential duplicate data block and the data content of one or more of the previously received data blocks in the fingerprint database. In the same or alternative embodiments, the verification may be performed between the potential duplicate data blocks. For example, potential duplicate data blocks with identical fingerprints may first be subject to a bit by bit comparison between each other to identify whether any of the potential duplicate data blocks are duplicate data blocks of each other. If any of the potential duplicate data blocks are duplicates of each other, then at least one of the potential duplicate data blocks may be deleted or removed. For example, a first potential duplicate data block received before a second potential duplicate data block may be deleted. As such, the deleted or removed duplicate may be the data block that was received first or earlier than the data block that remains. Next, the verification may be performed on the remaining potential duplicate data blocks and the data blocks of the fingerprint database in the duplicate file. In some embodiments, this verification may also be a bit by bit comparison of the data content of each potential duplicate data block with one or more of the data blocks from the fingerprint database. Potential duplicate data blocks with identical data content as one of the previously received data blocks of the fingerprint database may then be deleted or removed (e.g., the pointer of the duplicate data block may be changed to the same location as the previously received data block) (at step 680). In some embodiments, the bit-by-bit comparison may be performed based on fingerprints. For example, the bit-by-bit comparison may be performed on a potential duplicate data block and previously received data blocks with an identical fingerprint.

In some embodiments, the data blocks may then be appended to the fingerprint database if the data blocks are associated with unique fingerprints. As such, the fingerprint database may be in any order for purposes of identifying duplicate data blocks. Thus, the technique 600 may append (at step 690) data blocks to the fingerprint database.

FIG. 7A is an exemplary representation of a bloom filter 700 in accordance with some embodiments. In some embodiments, the bloom filter 700 may be stored within a memory 240 of a storage system 120. In general, the bloom filter 700 comprises a plurality of entries where a finger corresponds to one or more entries. For example, in some embodiments, a fingerprint may correspond to a plurality of entries of the bloom filter. As an example, the following disclosure recites a fingerprint corresponding to two entries, but in some embodiments, a fingerprint may correspond to three entries. As such, any amount of entries may correspond to a fingerprint and the following disclosure is not intended to limit a fingerprint to any one number of bloom filter entries. In some embodiments, bloom filter entries 720 and 721 may comprise a value of '1' to indicate that the fingerprint associated with the bloom filter entries 720 and 721 has been previously identified from a previously received data block (e.g., from a previous change log). As such, the bloom filter entries 720 and 721 may indicate that a data block associated with the fingerprint corresponding to the bloom filter entries was received in a previous change log and is now recorded in the fingerprint database (e.g., fingerprint database 291). The bloom filter 700 may further comprise bloom filter entries 730, 731, 740, and 741, where each of the bloom filter entries comprises a value of '0' to indicate that the fingerprint associated with the respective bloom filter entries 730, and 731 and entries 740 and 741 has not been identified from a previously received data block of the corresponding fingerprint from a previous change log.

FIG. 7B is an exemplary representation of an updated bloom filter 750 with updated entries in accordance with some embodiments. In general, the updated bloom filter 750 may represent the bloom filter 700 of FIG. 7A after updating the entries of the bloom filter 700 to reflect unique data blocks from a received change log (e.g., as discussed with regard to step 650 of FIG. 6). In some embodiments, entries of the bloom filter may be updated (e.g., changed from '0' to '1') to indicate that a data block with a corresponding fingerprint has been previously received. For example, a new data block with a fingerprint corresponding to bloom filter entries may be received and the bloom filter entries may be modified to reflect that the fingerprint of the new data block has been received. In response to receiving the new data block with a new fingerprint, updated bloom filter entries 770 and 771 may be changed from a '0' to a '1'. However, if a new data block with a fingerprint corresponding to updated bloom filter entries 780 and 781 has not been received, then the updated bloom filter entries 780 and 781 may not be updated (e.g., the value of updated bloom filter entries 780 and 781 remain at '0').

In some embodiments, once an entry of the bloom filter (e.g., bloom filter 700 and/or updated bloom filter 750) has been updated (e.g., changed from '0' to '1'), the entry of the bloom filter may not be reversed (e.g., changed from a '1' to a '0'). As such, the entries of the bloom filter may only be changed once (e.g., in response to receiving a fingerprint associated with a new data block). In the same or alternative embodiments, each data block may correspond to a plurality of bloom filter entries. For example, three fingerprints may be determined for each data block. As such, three bloom filter entries may be compared with three fingerprints of a received data block and if all three of the bloom filter entries indicate that the fingerprints have been previously received (e.g., the bloom filter entries are '1'), then the received data block may be identified as a potential duplicate data block. However, if at least one of the bloom filter entries indicates that the fingerprint corresponding to the bloom filter entry has not been identified from a previously received data block, then the new data block may be identified as a unique data block.

Figure 8:
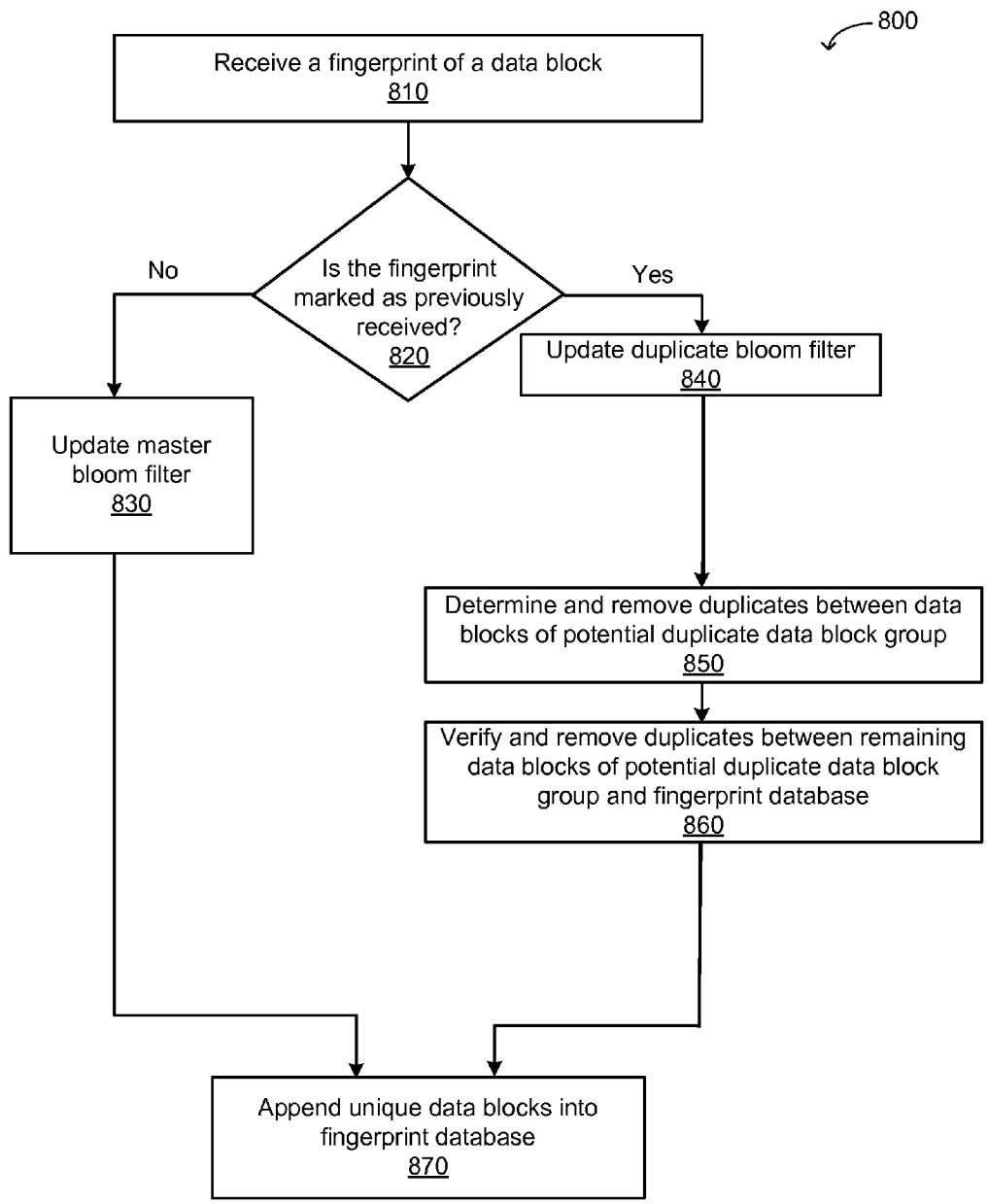
FIG. 8 is a flowchart of a technique to process a data block based on a fingerprint in accordance with some embodiments.
Figure 10A:
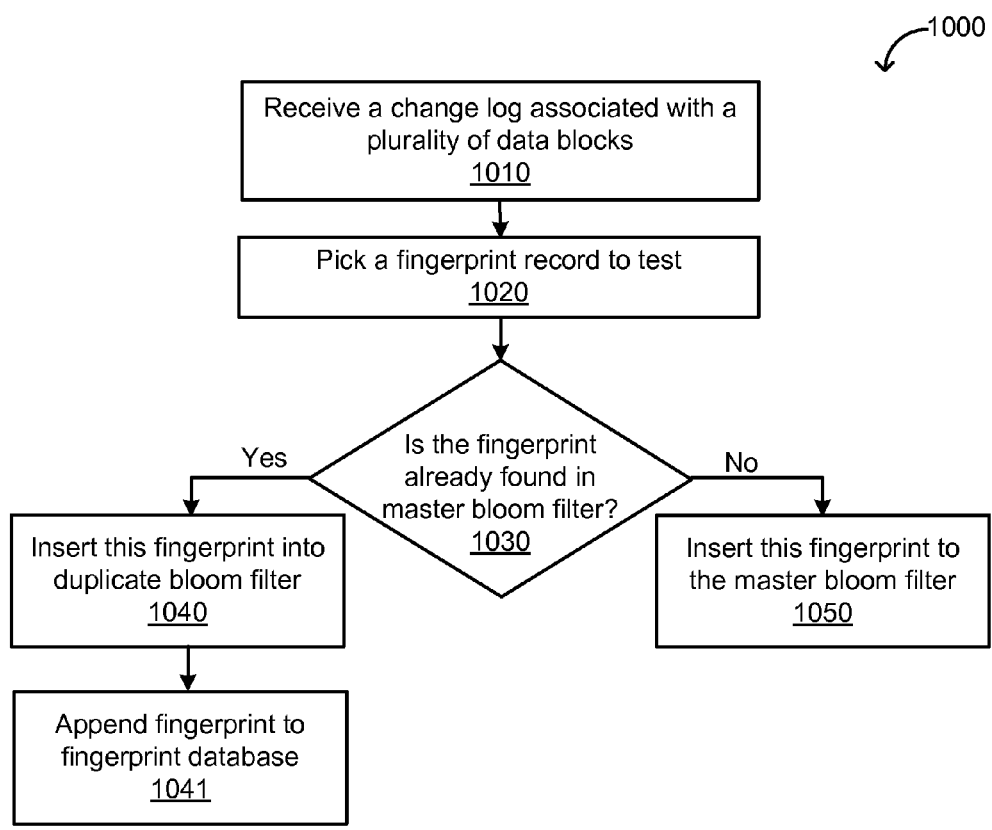
FIG. 10A is a flowchart of a technique to prepare a duplicate bloom filter in which some embodiments operate.
Figure 10B:
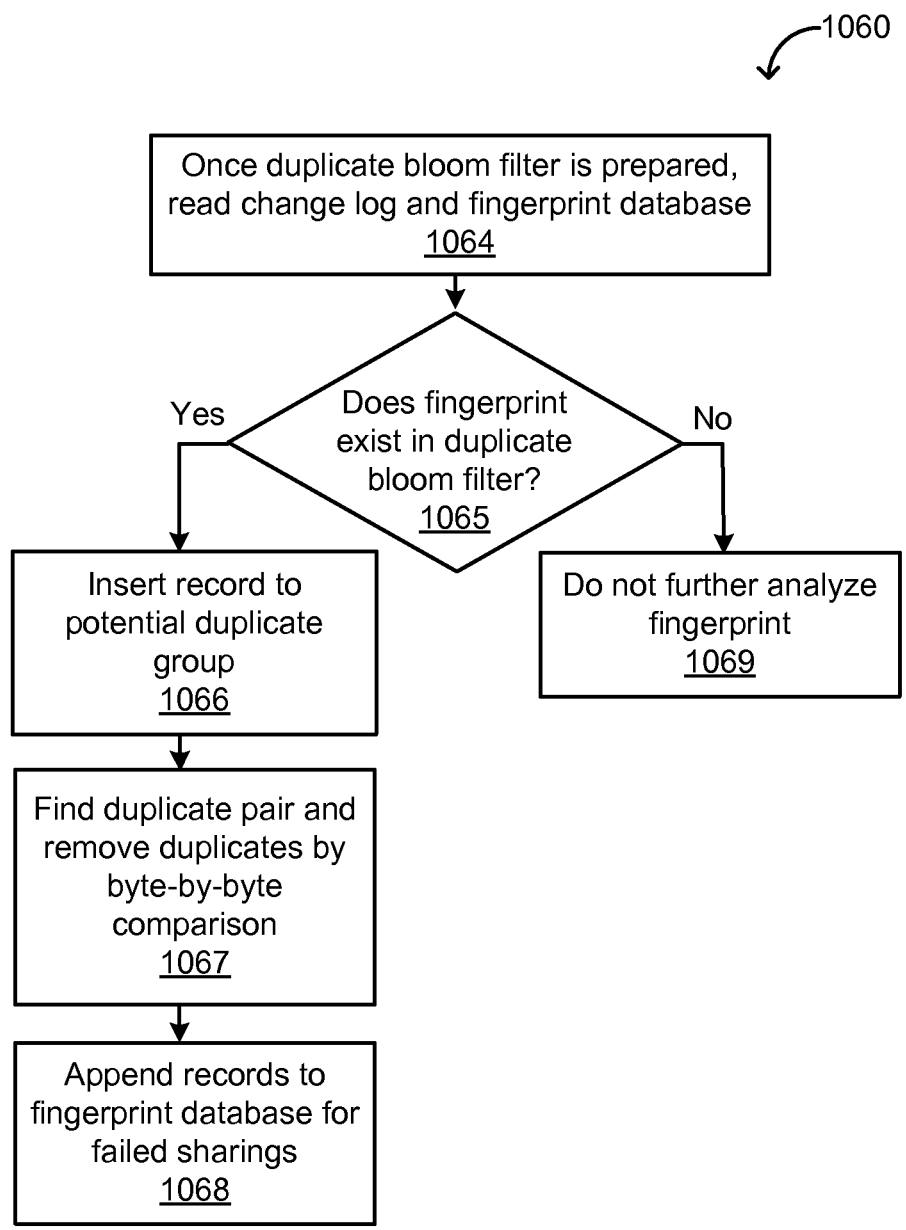
FIG. 10B is a flowchart of a technique to use a duplicate bloom filter to delete potential duplicates in which some embodiments operate.

FIG. 8 is a flowchart of a technique 800 to process a new data block based on a fingerprint in accordance with some embodiments. In some embodiments, some of the steps of the technique 800 are performed or caused to be performed by a storage operating system 300 of a storage system 120 by using the deduplication layer 275. The storage operating system 300 and/or deduplication layer 275 may be configured to operate in conjunction with other software modules of the storage system 120, server system 110, and software modules to collectively perform the embodiments described herein.

As shown in FIG. 8, the technique 800 may receive (at step 810) at least one fingerprint associated with a data block. For example, a fingerprint determined for a new data block from a received change log may be received. The technique 800 may further determine (at step 820) if the received fingerprint is marked as previously received in a bloom filter (e.g., bloom filter 700). For example, the received fingerprint may be used to determine if one or more bloom filter entries corresponding to the fingerprint comprises a '1' to indicate that a data block corresponding to the fingerprint has been previously received or at least one of the bloom filter entries is a '0' to indicate that a data block corresponding to the fingerprint has not been previously received. If the received fingerprint is not marked as being previously received by entries of the bloom filter, then the bloom filter may be updated (at step 830). For example, in some embodiments, the new data block associated with the received fingerprint may be placed into a unique data block group. However, if the received fingerprint is marked as being previously received by entries of the bloom filter, then the new data block corresponding to the received fingerprint may be placed (at step 840) into a potential duplicate data block group. The technique 800 may further determine and remove (at step 850) duplicates between data blocks placed in the potential duplicate data block group. For example, potential duplicate data blocks with identical fingerprints may be subject to a bit-by-bit comparison to determine if any of the potential duplicate data blocks are duplicates of each other. If any of the potential duplicate data blocks are identified as duplicates, then at least one of the potential duplicate data blocks may be removed. As such, the potential duplicate data block group may be reduced if any of the potential duplicate data blocks are duplicates of each other. Next, the technique 800 may verify and remove (at step 860) the remaining potential duplicate data blocks (e.g., after removing any of the duplicates as disclosed with regard to step 850). For example, the remaining potential duplicate data blocks may be compared bit by bit with data blocks recorded in the fingerprint database. In some embodiments, remaining potential duplicate data blocks may be compared bit by bit with a data block recorded in the fingerprint database with an identical fingerprint as the remaining potential duplicate data block. In some embodiments, any data blocks that are found to be identical after a bit by bit comparison is performed may result in the removal of at least one of the data blocks. The technique 800 may further merge (at step 870) data blocks into the fingerprint database. For example, data blocks placed into the unique data block group (e.g., from step 830) and data blocks remaining in the potential duplicate data block group (e.g., after step 860) may be merged into the fingerprint database. In some embodiments, the merging of the data blocks may involve ordering the data blocks into the fingerprint database based on the location of the data blocks.

In some embodiments, the systems and methods disclosed herein (e.g., techniques 500, 600, and/or 800) may be applied to a plurality of partitions. For example, a data set may be partitioned into a multiple logical partitions, where each of the logical partitions may be independently deduplicated. Each data block of a data set may be assigned to exactly one logical partition such that two or more data blocks identified as duplicates are assigned to the same logical partition. As such, a bloom filter (e.g., bloom filter 700 and/or updated bloom filter 750) may be used for one logical partition and multiple bloom filters may be used such that a single bloom filter is used for a single logical partition. As such, the logical partitions may be used to reduce the size of the bloom filter as opposed to a bloom filter for a data set with no logical partitions.

FIG. 9 is an exemplary fingerprint database 291 used in some embodiments. In some embodiments, the fingerprint database 291 comprises a plurality of dataset entries 905, each dataset entry 905 representing a data block, a fingerprint of the data block, and a location of the data block. Each dataset entry 905 may comprise a plurality of data fields for storing data describing or identifying a data block (e.g., from a change log), a fingerprint that was calculated for the data block (e.g., described with regard to step 620 of FIG. 6), and a location of the data block (e.g., the location to which the pointers of the data block refer to). As such, in some embodiments, each dataset entry 905 identifies a fingerprint and a location of each data block associated with a change log.

In some embodiments, a fingerprint database 291 may comprise a record for data blocks used in a storage system (e.g., storage system 120). The fingerprint database 291 may comprise dataset entries 905 for sorted data blocks and unsorted data blocks. For example, a sorted data blocks field 910 may comprise dataset entries 905 for data blocks that are ordered based on a location associated with the data block. For example, the data blocks may be ordered based on an inode and a file block associated with the data block. As such, the sorted data blocks field 910 may be arranged based on an ordering of an inode number and a file block number associated with each data block. In some embodiments, the fingerprint database 291 may further comprise dataset entries 905 for unsorted data blocks. For example, an unsorted data blocks field 920 may comprise dataset entries 905 for data blocks that are not ordered based on a location associated with the data blocks. As such, the unsorted data blocks field 920 may comprise dataset entries 905 indicating data blocks that are not ordered based on a location (e.g. inode and file block) associated with each of the data blocks. As such, the fingerprint database 291 may comprise a plurality of dataset entries 905 corresponding to data blocks. The database 291 may comprise a sorted data blocks field 910 to comprise sorted (e.g., based on location) data blocks and an unsorted data blocks field 920 to comprise unsorted data blocks.

As shown in FIG. 9, the fingerprint database 291 may comprise data fields for a data block field 930, fingerprint field 940, and location field 950. The data block field 930 may comprise information identifying a data block associated with a write request to a storage system (e.g., storage system 120). In some embodiments, the data block field 930 may identify a data block received from a change log (e.g., as disclosed with regard to step 610 of FIG. 6) and/or from a previous change log. For example, data blocks associated with a previous change log may relate to the sorted data block fields 910 and data blocks associated with a new change log may relate to the unsorted data blocks field 920.

The fingerprint field 940 may identify a fingerprint for each data blocks that was written to a storage system. For example, the fingerprint field 940 may identify a fingerprint for each data block associated with a change log. In some embodiments, the fingerprint field 940 may comprise a numerical value corresponding to a fingerprint for each of the data blocks. In the same or alternative embodiments, the fingerprints for a first data block and a second data block may be the same or the fingerprints may be different. For example, the two data blocks may have the same fingerprint value as identified from the fingerprint field 940, but the data content associated with the data block is different. As such, the fingerprint field 940 may comprise a plurality of fingerprint values, some of which may be identical.

In some embodiments, the location field 950 may comprise information to identify a location associated with a data block. For example, the location field 950 may comprise an inode number and a file block number associated with a pointer of the data block. In some embodiments, the inode number and a file block number corresponds to a location for underlying data to which the pointer of the data block is referencing. In some embodiments, the sorted data blocks field 910 may be ordered based on the location specified by the location field 950.

Various Embodiments

Some embodiments may be conveniently implemented using a conventional general purpose or a specialized digital computer or microprocessor programmed according to the teachings herein, as will be apparent to those skilled in the computer art. Some embodiments may be implemented by a general purpose computer programmed to perform method or process steps described herein. Such programming may produce a new machine or special purpose computer for performing particular method or process steps and functions (described herein) pursuant to instructions from program software. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information may be represented using any of a variety of different technologies and techniques.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a non-transitory computer readable medium. The computer readable medium may comprise a storage medium having instructions stored thereon/in which may be used to control, or cause, a computer to perform any of the processes of an embodiment. The storage medium may include, without limitation, any type of device including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, circuits, modules, algorithms, techniques, processes, or method steps of embodiments described herein may be implemented as computer electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The algorithm, techniques, processes, or methods described in connection with embodiments disclosed herein may be embodied directly in hardware, in software executed by a processor, or in a combination of the two. In some embodiments, any software application, program, tool, module, or layer described herein may comprise an engine comprising hardware and/or software configured to perform embodiments described herein. In general, functions of a software application, program, tool, module, or layer described herein may be embodied directly in hardware, or embodied as software executed by a processor, or embodied as a combination of the two. A software application, layer, or module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

What is claimed is:

1. A device comprising:
   a processor;
   a computer readable medium having instructions stored thereon, the instructions comprising instructions which, when executed by the processor, cause the device to:
   determine a first data block identified in a change log, wherein the first data block is associated with a content identifier;
   generate a plurality of hashes based, at least in part, on the content identifier, wherein each of the hashes is generated by a different hash function, wherein each of the plurality of hashes identifies one of a plurality of entries of a first bloom filter;
   determine whether the content identifier has been previously received based, at least in part, on the plurality of hashes and the first bloom filter;
   in response to a determination that the content identifier has not been previously received, update the first bloom filter to indicate that the content identifier was received; and
   in response to a determination that the content identifier may have been previously received,
      update a second bloom filter to indicate that the content identifier was received a second time; and
      indicate, in a fingerprint database, that the first data block is a potential duplicate.

2. The device of claim 1, wherein the instructions further comprise instructions which, when executed by the processor, cause the device to determine whether the first data block is identical to a second data block in response to a determination that the content identifier may have been previously received.

3. The device of claim 1, wherein the content identifier comprises a fingerprint value based, at least in part, on content of the first data block.

4. The device of claim 1,
   wherein the instructions which, when executed by the processor, cause the device to determine whether the content identifier may have been previously received comprise instructions which, when executed by the processor, cause the device to determine whether each of the plurality of entries identified by the plurality of hashes is set to a predetermined value,
   wherein a determination that each of the plurality of entries identified by the plurality of hashes is set to the predetermined value comprises a determination that the content identifier may have been previously received,
   wherein a determination that at least one of the plurality of entries identified by the plurality of hashes is not set to the predetermined value comprises a determination that the content identifier has not been previously received.

5. The device of claim 1,
   wherein the instructions which, when executed by the processor, cause the device to update the first bloom filter to indicate that the content identifier was received comprise instructions which, when executed by the processor, cause the device to set each of the plurality of entries of the first bloom filter identified by the plurality of hashes to a predetermined value,
   wherein the instructions which, when executed by the processor, cause the device to update the second bloom filter to indicate that the content identifier was received a second time comprise instructions which, when executed by the processor, cause the device to set each of a plurality of entries of the second bloom filter identified by the plurality of hashes to the predetermined value.

6. The device of claim 1, wherein the first bloom filter identifies a first set of content identifiers that have been received one or more times.

7. The device of claim 6, wherein the second bloom filter identifies a second set of content identifiers that have been received more than one time.

8. A computer-implemented method comprising:
   determining a first data block identified in a change log, wherein the first data block is associated with a content identifier;

generating a plurality of hashes based, at least in part, on the content identifier, wherein each of the hashes is generated by a different hash function, wherein each of the plurality of hashes identifies one of a plurality of entries of a first bloom filter;

determining whether the content identifier has been previously received based, at least in part, on the plurality of hashes and the first bloom filter;

in response to determining that the content identifier has not been previously received, updating the first bloom filter to indicate that the content identifier was received; and in response to determining that the content identifier may have been previously received, updating a second bloom filter to indicate that the content identifier was received a second time; and indicating, in a fingerprint database, that the first data block is a potential duplicate.

9. The method of claim 8 further comprising determining whether the first data block is identical to a second data block in response to determining that the content identifier may have been previously received.

10. The method of claim 8, wherein the content identifier comprises a fingerprint value based, at least in part, on content of the first data block.

11. The method of claim 8,
wherein determining whether the content identifier may have been previously received comprises determining whether each of the plurality of entries identified by the plurality of hashes is set to a predetermined value,
wherein determining that each of the plurality of entries identified by the plurality of hashes is set to the predetermined value comprises determining that the content identifier may have been previously received,
wherein a determining that at least one of the plurality of entries identified by the plurality of hashes is not set to the predetermined value comprises determining that the content identifier has not been previously received.

12. The method of claim 8,
wherein updating the first bloom filter to indicate that the content identifier was received comprises setting each of the plurality of entries of the first bloom filter identified by the plurality of hashes to a predetermined value,
wherein updating the second bloom filter to indicate that the content identifier was received a second time comprises setting each of a plurality of entries of the second bloom filter identified by the plurality of hashes to the predetermined value.

13. The method of claim 8, wherein the first bloom filter identifies a first set of content identifiers that have been received one or more times.

14. The method of claim 13, wherein the second bloom filter identifies a second set of content identifiers that have been received more than one time.

15. A non-transitory computer readable medium having instructions stored therein, the instructions:

determine a data block identified in a change log, wherein the data block is associated with a fingerprint generate a plurality of hashes based, at least in part, on the fingerprint, wherein each of the hashes is generated by a different hash function, wherein each of the plurality of hashes identifies one of a plurality of entries of a first bloom filter;

determine whether the fingerprint has been previously received based, at least in part, on the plurality of hashes and the first bloom filter;

in response to a determination that the fingerprint has not been previously received, update the first bloom filter to indicate that the fingerprint was received; and in response to a determination that the fingerprint may have been previously received, update a second bloom filter to indicate that the fingerprint was received a second time; and indicate, in a fingerprint database, that the data block is a potential duplicate.

16. The non-transitory computer readable medium of claim 15, wherein the fingerprint comprises a value based, at least in part, on content of the data block.

17. The non-transitory computer readable medium of claim 15,
wherein the instructions to determine whether the fingerprint may have been previously received comprise instructions to determine whether each of the plurality of entries identified by the plurality of hashes is set to a predetermined value,
wherein a determination that each of the plurality of entries identified by the plurality of hashes is set to the predetermined value comprises a determination that the fingerprint may have been previously received,
wherein a determination that at least one of the plurality of entries identified by the plurality of hashes is not set to the predetermined value comprises a determination that the fingerprint has not been previously received.

18. The non-transitory computer readable medium of claim 15,
wherein the instructions to update the first bloom filter to indicate that the fingerprint was received comprise instructions to set each of the plurality of entries of the first bloom filter identified by the plurality of hashes to a predetermined value,
wherein the instructions to update the second bloom filter to indicate that the fingerprint was received a second time comprise instructions to set each of a plurality of entries of the second bloom filter identified by the plurality of hashes to the predetermined value.

19. The non-transitory computer readable medium of claim 15, wherein the first bloom filter identifies a first set of fingerprints that have been received one or more times.

20. The non-transitory computer readable medium of claim 19, wherein the second bloom filter identifies a second set of fingerprints that have been received more than one time.

* * * * *